Patented Aug. 3, 1943

2,325,586

UNITED STATES PATENT OFFICE 2,325,586

POLYMERIC GUANIDINES AND PROCESS FOR PREPARING THE SAME

Elmer K. Bolton and Donald D. Coffman, Wilmington, and Lucius Gilman, Arden, Del., assignors to E. I. du Pont de Nemours & Company, Wilmington, Del., a corporation of Delaware No Drawing. Application March 21, 1940, Serial No. 325,232

15 Claims. (Cl. 260—2)

This invention relates to polymeric compounds. More particularly it relates to polymeric guanidines, and even more particularly this invention relates to polyguanidines and salts thereof, that is, to compositions of matter containing in open chain configuration a plurality of separate and distinct guanido groups represented as

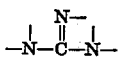

and to processes for preparing the same.

This invention has as an object new polymeric products, and processes for preparing the same. A further object is new compositions of matter containing the recurring guanido group, that is, containing a plurality of separate and distinct guanido groups. Still another object is a polymeric guanidine which enhances the dye receptivity and water repellency of materials containing it. Other objects will appear hereinafter.

Broadly stated, these objects are accomplished by reacting a compound containing two amino groups, said amino groups bearing each at least one free amino hydrogen, with a carbon nitrogen compound wherein a carbon atom is linked to at least one nitrogen atom by at least two valences, said compound being taken from the group consisting of cyanogen halides, monomeric guanidines, guanido acid esters, dicyanamides and isocyanide dihalides, until a polymeric reaction product is formed. The resulting products, which are also part of this invention, are characterized by the presence, in an open chain configuration, of a plurality of guanido groups,

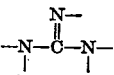

They may be represented graphically by the general formula:

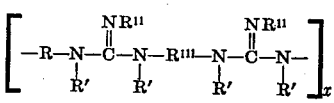

wherein R and R¹¹¹, which, according to the choice of initial reactants, may be identical or different, are divalent organic radicals comprising at least four atoms in a straight chain, i. e., four atoms exclusive of lateral substituents; R' may be hydrogen, hydrocarbon or cyano radicals, and R¹¹ may be hydrogen or hydrocarbon radicals, with the proviso that, when R or R¹¹ are aromatic, R' must be hydrogen or an aliphatic radical; and $x$ is an integer greater than one.

When R and R¹¹¹ are identical, the general formula becomes:

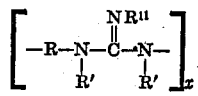

These polymeric products are further characterized by the fact that, on hydrolysis, they are resolved into diamines of the formulae NHR'—R—NHR' and NHR'—R¹¹¹—NHR' or amino-acids when the polymerization reaction involves a guanido ester, monoamines R¹¹NH₂ (or ammonia if R¹¹=H) and carbon dioxide.

The polymeric guanidines of this invention are sometimes obtained in the form of their acid salts, or can be readily converted to acid salts. These salts are often more stable and more convenient to handle than the free polymeric bases, and this invention includes them as well as the free bases.

More specifically the polymeric substances of this invention are prepared by the following general methods:

(I) A diamine and a guanidine as represented in the equation below and containing R, R' and R" groups as hereinbefore defined, are reacted in substantially equivalent proportions in the presence or absence of a solvent and/or diluent in an atmosphere inert to the reactants (e. g., an atmosphere free of oxygen, moisture, and acidic gases, such as carbon dioxide or sulfur dioxide) at temperatures ranging from 60° to 250° C. and for sufficient time to effect substantially complete condensation, or, in this case, until evolution of ammonia has practically ceased.

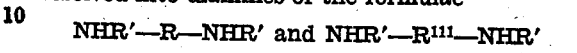

(II) A diamine as represented in the equation below and containing R and R' groups as hereinbefore defined, is reacted with a cyanogen halide in an inert solvent at temperatures below 200° C.

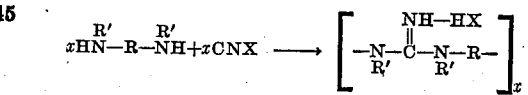

The cyanogen halide is introduced into the diamine solution either in gaseous form or in solution. To promote a still higher degree of polymerization, the polymer can be freed from the solvent and heated under nonoxidizing conditions to temperatures up to 250° C. The polymeric guanidine can be subsequently freed from its hydrohalide salt by treatment with aqueous alkali.

(III) An N,N'-dicyanamide and a diamine, as represented below and as hereinbefore defined, are allowed to react under the conditions outlined in (I) above. No by-products are evolved in this reaction.

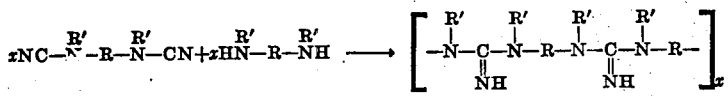 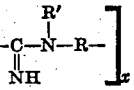

The R's present in the dicyanamide and diamine can be identical or different.

(IV) An N,N'-dicyanamide of the type A, wherein the two amino groups each bear a free amino hydrogen, and an N,N'-dicyanamide of the type B, as represented below and containing R and R' groups as hereinbefore defined, are allowed to react under the conditions described under (I) above. No by-products are evolved. There is formed a polyguanidine C in which one-half of the nitrogen substituents are cyano groups.

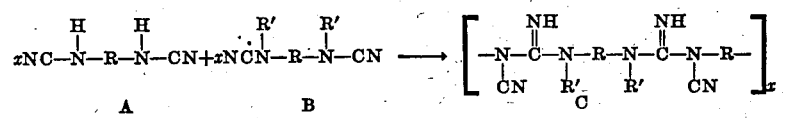 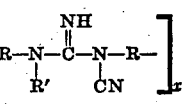

The R's of the dicyanamides A and B can be identical or different. The N,N'-dicyanamide A also can react with itself to yield a polymeric guanidine of the type C in which R' is a hydrogen atom.

(V) An isocyanide dihalide and a diamine, as represented below, in which R'' has the hereinbefore defined significance except that it cannot be a hydrogen atom, while the diamine contains the R and R' groups as hereinbefore defined, are allowed to react in an inert solvent at temperatures varying from 10–150° C. to obtain a polyguanidine hydrohalide. The isocyanide dihalide is preferably a dichloride or dibromide since the diiodide is too unstable for practical purposes.

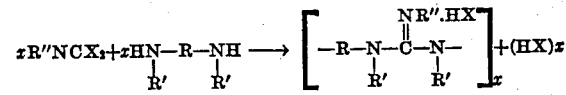

Removal of the polymeric salt from the solvent and subsequent heating in an inert atmosphere at temperatures up to 250° C. increases the molecular weight of the polymer. The polyguanidine can be freed from its salt by addition of alkali such as sodium hydroxide. The polyguanidine can also be initially formed free of hydrohalide salt by mixing the ingredients in the presence of a basic agent such as triethylamine or potassium carbonate.

(VI) In another aspect of this invention the self-condensation of a guanido ester gives rise to a polyacyl guanidine as follows:

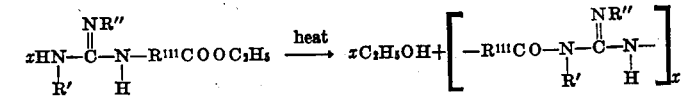

As represented above, R' and R'' are as hereinbefore defined, while the radical —R'''CO— contains at least four chain atoms and corresponds to the divalent radical R of the general formula. Here again the condensation takes place under conditions outlined in (I) above, until evolution of alcohol has practically ceased. It is also possible to prepare these polyacyl guanidines by condensing guanidine or a substituted guanidine

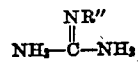

with an ester of an amino acid of the type $NH_2$—$R^{111}$—COOH, or reacting a diamine with a guanido ester according to a mechanism similar to the one outlined under (I) above.

The preferred procedures in carrying out each of the six methods of synthesis already described are as follows:

(I) *Condensation of a guanidine with a diamine*

An equimolar mixture of a guanidine and a diamine as hereinbefore defined is heated in an inert nitrogen atmosphere for 2 to 12 hours or longer in a sealed vessel at 130–180° C. The vessel, thoroughly swept out with deoxidized nitrogen, is connected to a receiver immersed in dry ice-acetone to facilitate the removal and condensation of the ammonia evolved in the reaction.

(II) *Condensation of cyanogen halides with a diamine*

By adding an equimolal quantity of cyanogen bromide dissolved in absolute ethanol to an anhydrous alcoholic solution of a diamine as hereinbefore described, and refluxing the stirred solution for one hour, there is formed a polyguanidine hydrobromide. The resulting clear solution is concentrated under reduced pressure, and the syrupy residue is further polymerized by heating to 175° C. in a vacuum for 7 hours. The free polyguanidine is best obtained by adding aqueous potassium hydroxide to an aqueous solution of the polymeric salt. Under these conditions the polymer separates from the aqueous solution.

(III) *Condensation of a dicyanamide with a diamine*

These ingredients are heated in equimolar amounts in a sealed vessel in the presence of deoxidized nitrogen for 2 to 10 hours at temperatures not higher than 250° C. and preferably at 130–180° C. as indicated under (I) above.

(IV) *Condensation of a dicyanamide with itself or another dicyanamide*

By heating for 3 to 10 days at 70° C. a dycyanamide (of the type NC—NH—R—NH—CN) in a sealed vessel in an atmosphere of deoxidized nitrogen, or by heating at higher temperatures up to 250° C. for shorter periods, self-condensation to an N-cyanopolyguanidine takes place. In this case the single initial material acts as both polyguanidine-forming reactants, through its two amino groups and its two cyano groups. Using the same conditions, the dicyanamide (of the type NC—NH—R—NH—CN) will condense with another dicyanamide in which the hydrogen atoms are replaced by hydrocarbon radicals to yield a similar polyguanidine containing cyano groups.

(V) Condensation of an isocyanide dichloride with a diamine

An isocyanide dihalide, preferably a dichloride, and a diamine as hereinbefore defined, react in dry benzene or other inert solvent in the presence of an equivalent amount of potassium carbonate at 45° C., to yield the substituted polyguanidine. This polymer can then be separated from the solvent and further polymerized by heating for 9 hours at 180° C. in a sealed tube containing deoxidized nitrogen.

(VI) Self-condensation of guanido esters

A guanido ester, in which the carbalkoxy and guanido groups are separated by at least three atoms in the chain, undergoes self-condensation when heated as described under (I) above. For example, heating for 2 hours in an atmosphere of deoxidized nitrogen is sufficient to effect polymerization. The amount of alcohol evolved as a by-product of the condensation serves as a measure of the extent of reaction. In the same manner, a guanido ester may be condensed with a diamine.

The polymeric guanidines described herein are more adequately defined in terms of their hydrolysis products. The hydrolysis of the polyguanidines is readily accomplished by heating a concentrated aqueous hydrochloric acid or hydrobromic acid solution containing the polyguanidine for 3 to 6 hours at 150–200° C. under a pressure of 700 lbs. gauge. Under these conditions, the polyguanidines are broken down into readily identifiable products. Thus, the hydrolysis of the polyguanidines formed by the above described methods will, in every case, yield a diamine (or an amino acid, with the products of process VI), carbon dioxide, and either a monoamine or ammonia. These simple hydrolysis products are further characterized by conversion to well-known derivatives.

Of the specific methods described above, the preferred one, for reasons of convenience, economy, and results obtained, is that described under (II), i. e. the reaction of a cyanogen halide with a diamine.

The invention is further described in and illustrated by the following examples in which the parts given are parts by weight.

EXAMPLE I

Poly (hexamethylene guanidine hydrobromide

To hexamethylenediamine (26.3 parts) dissolved in 189 parts of dry ethanol at reflux is added dropwise with stirring cyanogen bromide (23.97 parts) in 89 parts of absolute ethanol during a period of one hour. The clear alcoholic solution is then concentrated at 40° C. and 25 mm. pressure, and the resulting syrup is gradually heated to 170° C. at a pressure of 2 mm. The polyguanidine hydrobromide formed in this condensation softens at 160° C. and has distinctly polymeric properties. For example, it can be formed (at 225° C.) into filaments a few inches long.

Analysis: Calc'd for: $[C_7H_{16}N_3Br]_x$ : Br, 35.98; N, 18.92.
Found: Br, 35.09; N, 18.34.

The free polyguanidine base is precipitated by adding aqueous potassium hydroxide to an aqueous solution of the polymeric salt. This base is purified by dissolving in absolute ethanol and evaporating to dryness at 100° C. (under reduced pressure) to remove traces of water and ethanol. A light, cream-colored polymer of spongy consistency is thereby obtained. The polymer is insoluble in most organic solvents, including toluene, dioxan, butanol, ethylene dichloride, acetonitrile, nitrobenzene. It is soluble in hot phenolic solvents and in glacial acetic acid.

Poly (hexamethylene guanidine) is characterized by its hydrolysis product as follows. By heating poly (hexamethylene guanidine hydrobromide) in concentrated hydrochloric acid for 5 hours at 180° C. and under 700 lbs. gauge pressure, there results a clear solution containing hexamethylenediamine dihydrochloride, ammonium chloride, and carbon dioxide. The diamine and ammonia, liberated when an excess sodium hydroxide was added to the solution, are characterized as a di-p-toluene-sulfonyl derivative (melting at 150° C. and showing no depression in a mixed melting point determination with an authentic specimen) and as ammonium chloride, respectively.

Cyanogen bromide is synthesized for these reactions by standard procedures employing the reaction of bromine on aqueous sodium cyanide.

EXAMPLE II

Poly (meta-phenylene guanidine hydrobromide)

Recrystallized meta-phenylenediamine melting at 62–64° C. (4.436 parts) is dissolved in about 5 times its weight of absolute ethanol, and an equimolar quantity of cyanogen bromide (4.36 parts) is added dropwise with stirring, the temperature never being allowed to exceed 25° C. When all the cyanogen bromide is added, the mixture is heated to reflux for 2 hours. A dark blue crystalline product is obtained by evaporating the solvent at 100° C./20 mm. This polymer is water soluble and can be formed into brittle filaments.

Analysis: Calc'd for $[C_7H_8N_3Br]_x$: Br, 37.33.
Found: Br, 38.27.

By treating an aqueous solution of the polymer with potassium carbonate, the free base is precipitated as a blue-gray powder which fuses at 110° C. and has the same solubility characteristics as the product of Example I. As in the previous example, poly-(meta-phenylene guanidine) or its hydrobromide is characterized by acid hydrolysis to meta-phenylene-diamine and ammonia.

EXAMPLE III

Poly (hexamethylene guanidine)

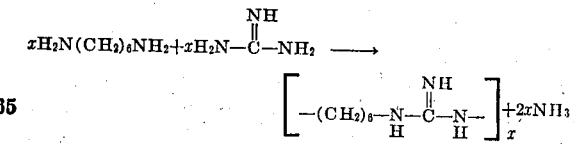

An equimolar mixture of hexamethylenediamine (9.35 parts) and guanidine (6.27 parts) is heated for 12 hours in a sealed tube at 130–160° C., the bomb being connected to a receiver immersed in dry ice to condense the evolved ammonia. At the end of 7 hours, the polymeric product is a turbid white liquid and the expansion tube had collected 83% of the calculated amount of ammonia. An additional 5 hours' heating at 155-160° C. does not noticeably change the appearance of the polymer which is white and dough-like at ordinary temperature.

The neutralization equivalent of this polymer is 120, as shown by titration in ethylene glycol using 0.1 N hydrochloric acid and methyl orange as indicator. From the neutralization equivalents of the reactants and of the reaction product having the formula given above, it can be shown by calculation that the polymer corresponds to an average of 5 moles of hexamethylene diamine condensed with 5 moles of guanidine, or to a product having a molecular weight of about 722.

EXAMPLE IV

Poly (N-cyano-hexamethylene guanidine)

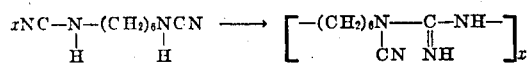

Hexamethylenedicyanamide (10 parts) is heated for 10 hours at 78° C. in a tube previously swept out thoroughly with deoxidized nitrogen. Upon cooling, the polyguanidine is glassy, colorless, infusible, and insoluble in most organic solvents.

Poly (N-cyano-hexamethylene guanidine) is characterized by its hydrolysis products which are ammonia, hexamethylenediamine, and carbon dioxide.

Hexamethylenedicyanamide is best prepared by treating two equivalents of cyanogen bromide in alcoholic potassium hydroxide with one equivalent of hexamethylenediamine. Potassium bromide separates at once and the reaction is complete in about two hours at room temperature. After filtering off the potassium bromide, the alcoholic solution is concentrated at room temperature under diminished pressure. The residual oily product solidifies slowly at the temperature of dry ice.

EXAMPLE V

Poly (1-oxo-hexamethylene guanidine)

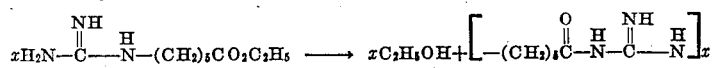

In a container equipped with an outlet leading to a receiver immersed in dry ice-acetone is placed ethyl epsilon-guanidocaproate (2.9 parts). After sweeping out the tube carefully with deoxidized nitrogen, the ester is heated at 155° C. for 1.5 hours followed by further heating at 180° C. for 30 minutes. The resulting polymer, formed by elimination of ethanol, is a light tan colored solid, melting at 65° C. and capable of being drawn into long brittle fibers. The polymer is soluble in dilute hydrochloric acid, and its hydrolytic products are epsilon-aminocaproic acid, ammonia, and carbon dioxide. Its molecular weight is 546, as determined by cryoscopy in glacial acetic acid.

Ethyl epsilon-guanidocaproate, melting at 85-90° C., is best prepared by eliminating methyl mercaptan in the reaction between S-methyl isothiourea and ethyl epsilon-aminocaproate.

Analysis: Calc'd for C₉H₁₉O₂N₃: N, 20.9; Found: N, 19.88.

EXAMPLE VI

Poly (hexamethylene-N,N'-dimethyl-N''-phenyl guanidine)

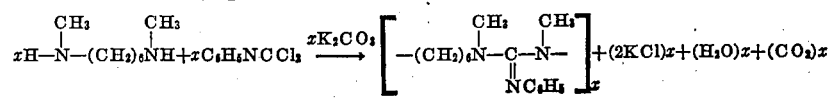

N,N' - dimethylhexamethylenediamine (1.195 parts) is dissolved in 8 parts of dry benzene to which is added potassium carbonate (1.2 parts). Phenyl isocyanide dichloride (1.44 parts), likewise dissolved in 8 parts of dry benzene, is introduced into the mixture dropwise with stirring at 45° C. After the reactants are thoroughly mixed, the benzene is distilled out in a current of nitrogen. The residue is powdered in a mortar and heated in a sealed tube for 9 hours at 180° C. After cooling, the bomb is opened. After removing the potassium carbonate by washing with water, the water-insoluble residue is heated further for 18 hours at 100° C. It is then a soft and plastic polymeric material.

By the general analytical procedure outlined previously, this polyguanidine is characterized in terms of its hydrolysis products which in this case are N,N'-dimethyl-hexamethylenediamine melting at 14-16° C. and aniline, characterized as acetanilide, melting point 114° C.

EXAMPLE VII

Poly (hexamethylene-N-methyl guanidine)

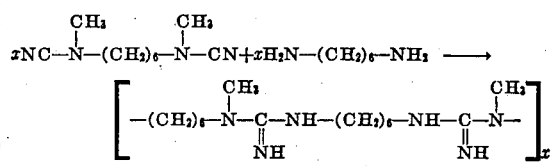

An equimolar mixture of N,N'-dimethylhexamethylenedicyanamide (5.79 parts) and hexamethylenediamine (3.46 parts) is heated for 9.5 hours at 250° C. in a sealed bomb in an inert atmosphere. The resulting polymer is a viscous oil at 250° C., a thick gel at room temperature. Hydrolysis with concentrated hydrochloric acid gives the hydrochloride salts of N,N'-dimethylhexamethylenediamine and ammonia.

N,N-dimethylhexamethylenedicyanamide is prepared by condensing 2 moles of cyanogen bromide with one mole of N,N'-dimethylhexamethylenediamine is absolute alcoholic potassium hydroxide. The dicyanamide is purified by recrystallization from a mixture of absolute ethanol and dry ether. It melts at 34.5-35.5° C. and contains 28.63% nitrogen, the calculated value being 28.84%.

In a similar manner, a polymeric product is prepared by heating 1.56 parts of N,N'-dimethyltriglycoldicyanamide

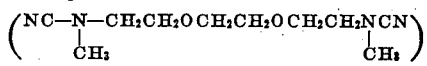

with 0.81 part of hexamethylenediamine in a sealed vessel in an inert atmosphere at 90° C. for 13 days. The hydrolytic products of this polymer are hexamethylenediamine, N,N'-dimethyltriglycoldiamine, and ammonia.

Another satisfactory process for preparing polyguanidines consists in reacting diamines with S,S'-dialkyl diisothioureas. The reaction is represented by:

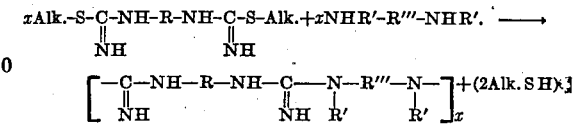

wherein R, R' and R'" have the significance previously indicated and Alk. is an alkyl radical. The products of this reaction are the desired polyguanidine and the thiol corresponding to the alkyl radical of the diisothiourea. This method is illustrated by the following example.

EXAMPLE VIII

A mixture of 2.62 parts of hexamethylene —S,S'—dimethyl diisothiourea and 1.16 parts of hexamethylenediamine is heated slowly to 120° C. At a temperature of 120–130° C. a vigorous reaction starts with the evolution of methyl mercaptan. When this product has practically ceased to be evolved, the reaction vessel is cooled and the residue of poly (hexamethylene guanidine) is collected as a resinous solid, insoluble in acetone, slightly soluble in water and soluble in dilute hydrochloric acid.

Still other processes may be used in the preparation of the polymeric guanidines of this invention, such as the reaction of a diamine with an imino carbonate of the type

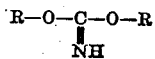

with the elimination of the alcohol corresponding to the radical R, or the reaction of cyanamide, NH₂CN, with a diamine.

It will be understood that the above examples are for purposes of illustration only and that the invention is not limited to the exact products, reactants, conditions and processes therein described but rather is susceptible of wide variation. Thus, there are a great number of widely diversified polymeric substances, having in common recurring separate and distinct guanido groups, that can be formed by the methods illustrated. In forming these polyguanidines a variety of reactants may be used in addition to those previously mentioned. Thus any diamine of the type

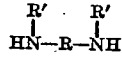

may be used. In this formula R is a divalent organic radical at least four atoms in length. R can be aromatic or aliphatic, and may include heteroatoms such as O or S, or polyvalent groups such as —CO—, —SO—, —SO₂—, —NR,— —CONH—, etc. The chain may bear substituents which may be hydrocarbon groups or hydroxy, alkyloxy, aryloxy, tertiary amino groups, etc. R' consists of hydrogen or hydrocarbon groups, provided that R' and R are not simultaneously aromatic in nature. Thus, the diamine used as one of the reactants can be, for example, tetramethylenediamine, pentamethylenediamine, hexamethylenediamine, decamethylenediamine, benzidine, diglycoldiamine

triglycoldiamine

beta-methyltetramethylenediamine, beta-ethoxyhexamethylenediamine, and para-phenylenediamine. In place of these primary diamines, N,N'-dialkylated or diarylated derivatives can also be employed. Thus, the N,N'-dimethyl, N,N'-diethyl, or N,N'-diphenyl derivatives of any of the above-mentioned primary aliphatic diamines are operable. In a preferred embodiment of this invention, R is a polymethylene radical containing at least four methylene groups, and the amino groups are both primary.

The polyguanidine-forming dicyanamides (i. e., those dicyanamides which undergo self-reaction or which react with a diamine to form a polyguanidine) of the type

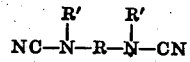

in which R and R' are as hereinbefore represented, are derived from the above classes of primary and secondary diamines simply by reacting one molecule of the diamine with two equivalents of a cyanogen halide such as cyanogen chloride, cyanogen bromide, or cyanogen iodide, in alcoholic alkali. From the standpoint of economy and convenience, the first two cyanogen halides mentioned are preferable.

The monomeric guanidines which may be reacted with a diamine in one of the methods of this invention comprise the class represented graphically as

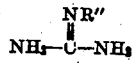

in which R" is a hydrogen atom or hydrocarbon radical. For example, guanidine, N"-phenyl, N"-methyl, N"-butyl, or N"-tolyl guanidines are operable. The guanidines, as already noted, give polyguanidines when allowed to react with the above-mentioned diamines. Guanidine itself is a preferred reactant in this method. By reacting the monomeric guanidines with an ester of an amino acid in which the amino group is separated from the carboxyl group by at least four atoms in the chain, polyacylguanidines may be obtained. Representative amino acids include epsilon-amino-caproic acid, omega-amino-nonoic acid, omega-amino-undecanoic acid, and 12-aminostearic acid. The polyacylguanidines may also be prepared by the self-condensation of the guanido esters, themselves conveniently obtained by reacting S-methyl isothiourea with the esters of the above amino acids.

In preparing polyguanidines by reacting a diamine of the above-mentioned classes with an isocyanide dihalide represented by R"NCX₂ in which R" is a hydrocarbon radical, the isocyanide dichlorides or bromides are usually employed in preference to an isocyanide diiodide since the latter types of halides are in general too unstable for practical purposes. Suitable isocyanide dihalides include phenyl isocyanide dibromide, xylyl isocyanide dichloride, phenyl isocyanide dichloride, methyl isocyanide dichloride, butyl isocyanide dibromide, and cyclohexyl isocyanide dichloride.

In effecting the formation of a polyguanidine by the reaction of a monomeric guanidine with a diamine, by the reaction of a diamine with a dicyanamide, by the self-reaction of a dicyanamide, and by the intermolecular reaction of two different dicyanamides, the choice of a solvent and/or a diluent, or their simultaneous use or omission, and also the duration and temperature of the reaction are factors which may be varied widely. Thus, a solvent may or may not be used. A solvent, however, is preferable, and nearly any non-acidic solvent, such as toluene, xylene, dioxane, trimethylamine, ethanol, or the various Cellosolve ethers, can be used. In general, anhydrous solvents are preferred since their use presents less opportunity for hydrolysis to occur. Small amounts of primary and secondary monoamines may, if desired, be added to serve as polymerization stabilizers, thus limiting the degree of polymerization to any desired extent. The reaction temperature can be varied from about 60° C. to about 250° C. although the preferable temperature range is from about 100° C. to about 200° C. The time required for reaction varies from about 2 to about 15 hours, depending upon the reactants involved. Usually superatmospheric pressure is employed when the reactions are carried out in sealed reaction vessels. However, atmospheric or subatmospheric pressures are operable.

Equimolar amounts of the two reactants are used, except in those cases where a stabilizer in the form of an excess of one reactant or a monofunctional reactant is introduced into the reaction mixture.

In carrying out the condensation of a diamine with a cyanogen halide, ethanol and toluene have been found to be excellent solvents. Neutral anhydrous solvents boiling under 200° C. are operable. Suitable solvents include petroleum ether, dioxan, diethyl ether, and xylene. The temperature for condensation should be held under about 200° C. to prevent self-polymerization of the cyanogen halide. However, after the initial reaction is complete, the temperature can be raised to about 250° C. in order to induce further polymerization. The reaction is completed in 1 to 12 hours, depending on the diamine and temperature of reaction.

The condensation of a guanidine with an amino acid ester or the self-condensation of a guanido ester to obtain a polyacylguanidine can be carried out in an atmosphere free of oxygen or acidic gases at temperatures preferably above the melting point of the polymer formed. Temperatures varying from about 100° C. to about 250° C. are suitable; it is usually observed that the higher the temperature, the greater is the reaction rate. These condensations are generally complete in 2 to 12 hours. Either superatmospheric, subatmospheric, or atmospheric pressures are operable.

In forming polyguanidines by the reaction of an isocyanide dihalide with a diamine the initial condensation of the two ingredients is carried out in an inert solvent such as benzene, chlorobenzene, toluene, xylene, dibutyl ether, or dioxan at relatively low temperatures, i. e. about 0° C. to about 150° C. The polyguanidine hydrohalide can then be separated from the solvent and further polymerized in an inert atmosphere at temperatures up to 250° C. The reaction time varies from 2 to 20 hours, depending on the ingredients used and the extent of polymerization desired. An alternative procedure involves the condensation of the isocyanide dichloride and diamine in the presence of an inert acid acceptor such as potassium carbonate, trimethyl amine, or triethylamine. In this case, the polyguanidine, free of its salt is formed in one step.

It is intended that the acid salts of the polymeric guanidines be included in this invention. One method of salt formation has been disclosed, this salt formation being inherent in the use of the cyanogen halides. Another method consists in treating the polymeric guanidines with an acid in amount substantially equivalent to the salt-forming groups of the polymer. This neutralization treatment can be carried out with or without a solvent or diluent. When a solvent is used, the salt is obtained in solution, which may be used or stored as such, or which may be evaporated if it is desired to obtain the salt in dry form. As examples of the acids which may be used to form salts may be mentioned hydrochloric, hydrobromic, hydriodic, sulfuric, nitric, phosphoric, carbonic, sulfurous acids; and such organic acids as formic, acetic, chloracetic, oxalic, succinic, adipic, sebacic, maleic, lauric, stearic, oleic, tartaric, lactic, sorbic, benzoic, phenylacetic, benzene sulfonic, toluene sulfonic acids, or mixtures of acids such as commercial stearic acid, or the acids obtained from coconut oil or fish oils. The acid salts of polymeric guanidines are sometimes easier to handle, store and use than the free bases, and for this reason are important.

As mentioned before, the polymeric guanidines obtained according to this invention are derived from the reaction between a compound containing two amino groups, each of which bears at least one primary nitrogen atom, and a carbon-nitrogen compound in which a carbon is linked to at least one nitrogen atom by at least two valences. These compounds can all be considered as derivatives of cyanic acid, and comprise cyanogen halides, monomeric guanidines, guanido esters, dicyanamides and isocyanide dihalides. The resulting products, i. e. the polymeric guanidines or salts thereof, contain in open chain configuration a plurality of recurring units represented generically by the formula

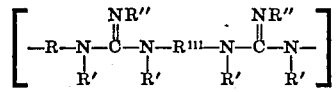

in which the various R's have the significance indicated above. As previously mentioned, $R'''$ may be, and often is, identical with R, in which case the generic recurring unit becomes more specifically

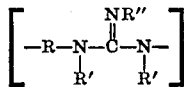

Methods I, II, V and VI give products in which R is always the same as $R'''$, while, in the products obtained by methods III and IV, R and $R'''$ may be identical or different, depending upon the choice of reactants. Considered more broadly, the products of this invention are linear polymers having, in open chain configuration a plurality of guanido groups,

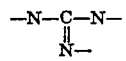

For reasons of stability, ease of preparation and availability of starting materials, a preferred class of products is that in which R and $R'''$ are divalent hydrocarbon radicals (identical or different) and R' and R'' are hydrogen. A still more preferred class is that in which R and $R'''$ are identical polymethylenic radicals, and R' and R'' are hydrogen.

The structure shown above for the products of this invention follows from the preparative methods, but is further conclusively demonstrated by the nature of the hydrolytic products, since a material composed of the structural units shown would be expected to give, on hydrolysis, the diamines NR'H—R—NR'H and

NR'H—$R'''$—NR'H (or only one diamine if R and $R'''$ are identical), a monoamine R''NH$_2$ (or ammonia if R''=H) and carbon dioxide, and the polyguanidines of this invention actually hydrolyze to these products.

These polyguanidines, as such or in the form of their salts, have been found to be particularly useful in modifying polyvinyl alcohol, cellulose acetate, and cotton. The specific effects imparted to these materials by aftertreatment with polyguanidines or by formation of the polymers in situ include enhanced dye receptivity and, in the case of cotton and other cellulosic materials, improved water repellency.

It is to be understood that the invention is not limited to the specific embodiments but includes all modifications and variations falling within the scope thereof as defined in the appended claims.

We claim:

1. Compounds of the following general formula

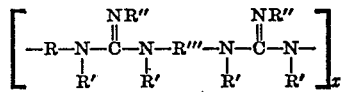

wherein R and R''' are divalent hydrocarbon radicals comprising at least four carbon atoms in a straight chain separating the nitrogen atoms, and R''' may differ from R, R' is a member of the group consisting of hydrogen, and aliphatic hydrocarbon radicals, R'' is a member of the group consisting of hydrogen and hydrocarbon radical, and $x$ is an integer greater than 1, said compound yielding on hydrolysis carbon dioxide, a nitrogen-containing compound of the group consisting of diamines of the formulae NHR'—R—NHR', NHR'—R'''—NHR' and amino acids, and monoamines of the formula R''NH$_2$; and the acid salts of these compounds.

2. Compounds of the formula

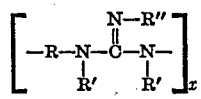

wherein R is a divalent hydrocarbon radical comprising at least four carbon atoms in a straight chain separating the nitrogen atoms, R' is a member of the group consisting of hydrogen, and aliphatic hydrocarbon radicals, R'' is a member of the group consisting of hydrogen and hydrocarbon radical, and $x$ is an integer greater than 1, said compound yielding on hydrolysis carbon dioxide, a nitrogen-containing compound of the group consisting of diamines of the formula NHR'—R—NHR' and amino acids, and monoamines of the formula R''NH$_2$; and the acid salts of these compounds.

3. Compounds of the group consisting of poly (hexamethylene guanidine) of the formula

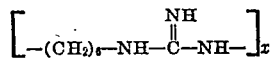

wherein $x$ is an integer greater than one, and the acid salts of this compound.

4. Poly (hexamethylene guanidine hydrobromide) of the formula

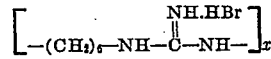

wherein $x$ is an integer greater than 1, said compound yielding on hydrolysis hexamethylenediamine, ammonia, and carbon dioxide.

5. Compounds of the group consisting of poly (meta-phenylene guanidine) of the formula

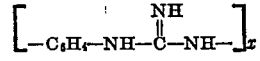

wherein $x$ is an integer greater than 1, and the acid salts of this compound.

6. Poly (meta-phenylene guanidine hydrobromide) of the formula

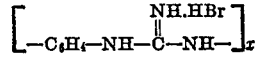

wherein $x$ is an integer greater than 1, said compound yielding on hydrolysis meta-phenylenediamine, ammonia, and carbon dioxide.

7. Poly (hexamethylene-N-methyl guanidine) of the formula

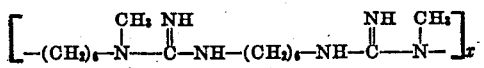

wherein $x$ is an integer greater than 1, said compound yielding on hydrolysis N,N'-dimethyl-hexamethylenediamine, ammonia, and carbon dioxide.

8. The process which comprises reacting a diamine of the formula H$_2$N—R—NH$_2$ wherein R is a hydrocarbon radical comprising at least four carbon atoms in a straight chain separating the nitrogen atoms, with a cyanogen halide in a neutral anhydrous solvent for the reactants, said solvent boiling under 200° C.; maintaining the reaction at a temperature below about 200° C. until a poly (guanidine hydrohalide) is formed, and heating further at a temperature below about 250° C. until the desired degree of polymerization is attained.

9. The process of forming poly (hexamethylene guanidine hydrobromide) which comprises reacting hexamethylenediamine with cyanogen bromide in anhydrous ethanol solution until the desired degree of polymerization is attained.

10. The process of forming poly (meta-phenylene guanidine hydrobromide) which comprises reacting meta-phenylene diamine with cyanogen bromide in anhydrous ethanol solution until the desired degree of polymerization is attained.

11. The process of forming poly (hexamethylene (N-methyl guanidine) which comprises reacting N,N'-dimethylhexamethylenedicyanamide and hexamethylenediamine in a sealed vessel and in an inert atmosphere, at a temperature not exceeding 250° C. until the desired degree of polymerization is attained.

12. Compounds of the following general formula

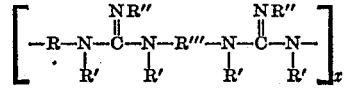

wherein R is a divalent polymethylene radical containing at least four methylene groups, R''' is a divalent hydrocarbon radical comprising at least four carbon atoms in a straight chain separating the nitrogen atoms, R' is a member of the group consisting of hydrogen and aliphatic hydrocarbon radicals, R'' is a member of the group consisting of hydrogen and hydrocarbon radicals, and $x$ is an integer greater than 1, said compound yielding on hydrolysis carbon dioxide, a nitrogen-containing compound of the group consisting of diamines of the formulae NHR'—R—NHR', NHR'—R'''—NHR', and amino acids, and monoamines of the formula R''NH$_2$; and the acid salts of these compounds.

13. Compounds of the formula

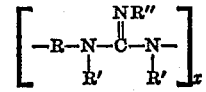

wherein R is a divalent polymethylene radical containing at least four methylene groups, R' is a member of the group consisting of hydrogen and aliphatic hydrocarbon radicals, R'' is a member of the group consisting of hydrogen and hydrocarbon radicals, and $x$ is an integer greater than 1, said compound yielding on hydrolysis carbon dioxide, a nitrogen-containing compound of the group consisting of diamines of the formula NHR'—R—NHR' and amino acids, and monoamines of the formula R"NH$_2$; and the acid salts of these compounds.

14. A process for preparing polymers having a plurality of guanido groups and corresponding to the formula

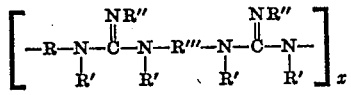

wherein R and R''' are divalent hydrocarbon radicals comprising at least four carbon atoms in a straight chain separating the nitrogen atoms and R''' may differ from R, R' is a member of the group consisting of hydrogen, and aliphatic hydrocarbon radicals, R" is a member of the group consisting of hydrogen and hydrocarbon radicals, and $x$ is an integer greater than 1, which comprises reacting a diamine of the formula

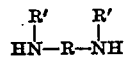

with a carbon-nitrogen compound of the group consisting of cyanogen halides, monomeric guanidines of the formula

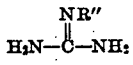

dicyanamides of the formula

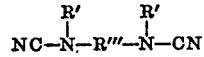

isocyanodihalides of the formula R"NCX$_2$ wherein R, R', R" and R''' are as defined above and X is a halogen, until a polymeric reaction product is formed.

15. Compounds of the group consisting of poly (hexamethylene-N-methyl guanidine) of the formula

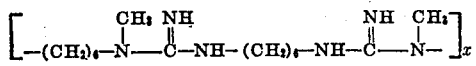

wherein $x$ is an integer greater than 1, and the acid salts of this compound, said compound yielding on hydrolysis N,N'-dimethyl-hexamethylene diamine, ammonia, and carbon dioxide.

ELMER K. BOLTON.
DONALD D. COFFMAN.
LUCIUS GILMAN.

Certificate of Correction

Patent No. 2,325,586. August 3, 1943

ELMER K. BOLTON, ET AL.

It is hereby certified that errors appear in the printed specification of the above numbered patent requiring correction as follows: Page 2, second column, line 56–57, for "dycyanamide" read *dicyanamide*; page 3, first column, line 52, after "hydrobromide" insert a closing parenthesis; page 4, first column, line 72, for "quanidine" read *guanidine*; and second column, line 71, for that portion of the formula reading "(2Alk.SH)" read $(2Alk.SH)_x$; page 5, first column, line 4, for "thre" read *the*; line 26, strike out "the" after "with"; line 50, for "—NR,—" read —$NR$—,; line 51–52, for "substiuents" read *substituents*; and that the said Letters Patent should be read with these corrections therein that the same may conform to the record of the case in the Patent Office.

Signed and sealed this 14th day of September, A. D. 1943.

[SEAL]

HENRY VAN ARSDALE,
*Acting Commissioner of Patents.*